US012560357B2

(12) United States Patent
Brendelberger et al.

(10) Patent No.: US 12,560,357 B2
(45) Date of Patent: Feb. 24, 2026

(54) SOLAR RADIATION RECEIVER AND REACTOR SYSTEM HAVING A SOLAR RADIATION RECEIVER

(71) Applicant: DEUTSCHES ZENTRUM FÜR LUFT—UND RAUMFAHRT E.V., Bonn (DE)

(72) Inventors: Stefan Brendelberger, Cologne (DE); Philipp Holzemer-Zerhusen, Cologne (DE)

(73) Assignee: DEUTSCHES ZENTRUM FÜR LUFT- UND RAUMFAHRT E.V., Bonn (DE)

( * ) Notice: Subject to any disclaimer, the term of this patent is extended or adjusted under 35 U.S.C. 154(b) by 437 days.

(21) Appl. No.: 18/016,506

(22) PCT Filed: Jul. 1, 2021

(86) PCT No.: PCT/EP2021/068130
§ 371 (c)(1),
(2) Date: Jan. 17, 2023

(87) PCT Pub. No.: WO2022/012941
PCT Pub. Date: Jan. 20, 2022

(65) Prior Publication Data
US 2023/0296289 A1 Sep. 21, 2023

(30) Foreign Application Priority Data
Jul. 15, 2020 (DE) ..................... 10 2020 118 651.7

(51) Int. Cl.
*F24S 20/20* (2018.01)
*C01B 3/04* (2006.01)
*C01B 3/042* (2026.01)

(52) U.S. Cl.
CPC ............... *F24S 20/20* (2018.05); *C01B 3/042* (2013.01); *F24S 2020/23* (2018.05)

(58) Field of Classification Search
None
See application file for complete search history.

(56) References Cited

U.S. PATENT DOCUMENTS 4,136,668 A * 1/1979 Davis ..................... F24S 60/00
126/633
4,403,601 A * 9/1983 Hunt ........................ F02C 3/365
126/643

(Continued)

FOREIGN PATENT DOCUMENTS

DE 102011001417 A1 9/2012
DE 102017200464 A1 7/2018

(Continued)

OTHER PUBLICATIONS

International Search Report and Written Opinion issued Oct. 12, 2021, in corresponding International Application No. PCT/EP2021/068130, 19 pages.

*Primary Examiner* — Jorge A Pereiro
(74) *Attorney, Agent, or Firm* — Maier & Maier, PLLC

(57) ABSTRACT

A solar radiation receiver having a receiver chamber having at least one radiation opening through which concentrated solar radiation can be introduced into the receiver chamber, having at least one solar absorber device which has at least one solid medium block which is fastened to a transport device, and having at least one opening through which the at least one solar absorber device is inserted such that the at least one solid medium block is arranged in the receiver, and through which the solar absorber device is removed.

22 Claims, 7 Drawing Sheets

(a)　(b)　(c)

(56)     References Cited

U.S. PATENT DOCUMENTS

|  |  |  |  |  |
|---|---|---|---|---|
| 4,459,973 | A | * | 7/1984 | Royer ..................... F24S 30/20 |
|  |  |  |  | 165/47 |
| 7,614,397 | B1 | * | 11/2009 | Munson, Jr. ........... F24S 30/45 |
|  |  |  |  | 126/618 |
| 9,011,560 | B2 | * | 4/2015 | Simmons ................... C10J 3/84 |
|  |  |  |  | 48/197 R |
| 9,295,961 | B2 | * | 3/2016 | Laska ..................... B01J 8/0025 |
| 9,663,363 | B2 | * | 5/2017 | Simmons ................... C10J 3/62 |
| 9,732,988 | B1 | * | 8/2017 | Spero ...................... F24S 70/00 |
| 10,072,224 | B2 | * | 9/2018 | Klausner ................ B01J 19/127 |
| 10,906,017 | B2 | * | 2/2021 | Klausner ................. B01J 8/067 |
| 2008/0086946 | A1 | * | 4/2008 | Weimer .................... C22B 5/12 |
|  |  |  |  | 48/89 |
| 2010/0242352 | A1 | * | 9/2010 | Perkins .............. C07C 29/1518 |
|  |  |  |  | 422/186.3 |
| 2011/0277956 | A1 | * | 11/2011 | Hermann ............. F28D 20/021 |
|  |  |  |  | 165/67 |
| 2013/0266502 | A1 | * | 10/2013 | Lichty ..................... C01B 3/061 |
|  |  |  |  | 422/600 |
| 2015/0307963 | A1 |  | 10/2015 | Niwa et al. |
| 2015/0308715 | A1 |  | 10/2015 | Erickson et al. |
| 2016/0305691 | A1 | * | 10/2016 | Sherwin ................. F24S 23/74 |
| 2017/0102192 | A1 | * | 4/2017 | Olsen ................... F28D 20/021 |
| 2019/0316812 | A1 | * | 10/2019 | Ho .......................... F24S 30/00 |

FOREIGN PATENT DOCUMENTS

|  |  |  |  |  |  |  |
|---|---|---|---|---|---|---|
| DE | 102018201319 | A1 | * | 8/2019 | ............. | F24S 60/10 |
| JP | 2013092266 | A | * | 5/2013 | ............. | F24S 23/77 |
| JP | 2014214953 | A | * | 11/2014 | ............. | F24S 23/79 |
| JP | 2014231917 | A | * | 12/2014 | ............. | F24S 20/30 |

* cited by examiner

SOLAR RADIATION RECEIVER AND REACTOR SYSTEM HAVING A SOLAR RADIATION RECEIVER

FIELD

The present invention relates to a solar radiation receiver and to a reactor system having such a solar radiation receiver.

BACKGROUND

It is known to use a redox material for the production of hydrogen or synthesis gas, wherein the redox material is used in redox cycle processes for the splitting of water and $CO_2$. First approaches provide to heat the redox material using solar energy for chemical reduction, wherein the redox material absorbs concentrated solar radiation.

According to first concepts, a particulate solid medium is used for the solar production of hydrogen by means of such thermochemical cycle processes. In this process, the solid medium is thermally reduced at high temperatures through a chemical reaction, using solar energy. Water vapor is supplied thereto at a later time. The medium is oxidized by the oxygen in the water so that hydrogen is produced. In order to continue the cycle process, the oxidized medium to be reduced again at high temperatures. In the known cycle processes, the particles fall freely through the focal point of the concentrated solar radiation or are moved through the same. Thereafter, the particles are moved into a reactor to carry out the oxidation. Such methods may have the advantage of a continuous process, however, there are problems with respect to the abrasion of the particles, the forming of dust by particle abrasion, and the particle transport.

So-called solid receivers exist, in which the medium is fixedly installed in the receiver and is alternately reduced and oxidized in a batch process. Such receivers cause disadvantages, since the process is not continuous.

Further, a basic problem of the known receivers is a missing or insufficient recuperation of the heat between the reduction step and the oxidation step.

A system is known from DE 10 2018 201 319 A1, in which blocks of redox material are transported through the receiver by means of a conveyor device. Transporting the blocks through the receiver is problematic because of the high temperatures.

Basically, it is a problem to continuously operate solar radiation receivers with a solar radiation-absorbent solid medium as a reaction medium or a heat carrier medium.

SUMMARY

Therefore, it is an object of the present invention to provide a solar radiation receiver, as well as a reactor system having such a solar radiation receiver, which can, in an advantageous manner, preferably be operated continuously with a solar radiation-absorbent solid medium as a reaction medium or a heat carrier medium and be used for solar-operated redox cycle processes in an advantageous manner.

The solar radiation receiver according to the invention comprises a receiver chamber with at least one radiation opening through which the concentrated solar radiation can be introduced into the receiver chamber. The solar radiation receiver according to the invention further comprises at least one solar absorber device with at least one solid medium block which is fastened to a transport means, and at least one opening through or into which the at least one solar absorber device is inserted and removed, wherein the at least one solid medium block is positioned in the receiver chamber by being inserted.

Thus, the solar radiation receiver according to the invention advantageously allows the solid medium intended to absorb solar radiation to be arranged in the receiver chamber in an exchangeable manner. After being heated by the concentrated solar radiation, the solar absorber device can be removed in a simple manner and be replaced with another solar absorber device. The transport means is a part of the solar absorber device and is moved along when the solar absorber device is inserted or removed. For example, the transport means can be engaged in order to move the solar absorber device.

The solar absorber receiver according to the invention may, for example, be arranged at a solar tower, wherein the concentrated solar radiation is directed onto the solar radiation receiver by means of one or a plurality of heliostats.

The solid medium block may consist of a redox material or a heat carrier material, for example.

The material of the solid medium block is preferably porous. Thereby, portions of concentrated solar radiation that are radiated onto the solar absorber device in the receiver chamber, can penetrate into the inside of the solid medium block, so that an improved absorption of the solar radiation and thus an improved heating of the solid medium block can be achieved. In addition, the surface area of the solid medium block is increased due to the porosity, so that the same provides a larger reaction surface when used as a reaction medium, e.g. in a redox cycle, whereby the reactions can occur in an enhanced manner.

The solar radiation receiver according to the invention may be provided with a plurality of radiation openings. Thereby, the irradiation from different directions (depending on the position of the sun) can be improved. Radiation openings that are used hardly or not at all may also be closed with a flap, so that radiation losses through these openings can be prevented. The radiation openings may be arranged on different sides of the solar radiation receiver, e.g. on the lower side or on one or more of the other sides. The arrangement of the radiation openings is adapted in particular to the position of the solar radiation receiver with respect to the heliostat(s) or with respect to the irradiation direction of the concentrated solar radiation. For example, further deflection reflectors may be provided, so that an irradiation direction from above is also possible. The plurality of radiation openings are preferably arranged on the sides of the solar radiation receiver facing the heliostats.

Preferably, it is provided that the solid medium block is connected to the transport means via an insulation means, whereby the transport means is thermally separated from the solid medium block, so that the thermal stress on the transport means can be reduced.

The solar absorber device according to the invention preferably comprises a solid medium block of a redox material, so that the solar absorber device can be used in a redox cycle process, wherein the redox material can be heated in a corresponding atmosphere, e.g. also under decreased total pressure, by means of the concentrated solar radiation, whereby a reduction of the redox material occurs. Thereafter, the solar absorber device is transported into a separate reactor. In the reactor, water vapor, for example, is supplied to the reduced redox material, wherein the water vapor is split, whereby hydrogen is formed. On the transport path to the separate reactor, heat from the heated redox material can be used to pre-heat cooler redox material that is transported to the solar radiation receiver (heat recovery).

The solar absorber device according to the invention may, however, also consist of a solid medium block of a different material, e.g. a heat carrier material, so that solar heat can be transported and e.g. be stored using the solar absorber device according to the invention. It is also possible that the solid medium block consists of a different material (e.g. a catalyst), which is used for other reactions than redox reactions.

It is preferably provided that the solid medium block has a maximum dimension in a height direction, a maximum dimension in a width direction and a maximum dimension in a length direction, wherein the height direction extends vertically and the width and length directions extend horizontally and the height direction, the width direction and the length direction are orthogonal to one another, wherein the maximum dimension of the solid medium block in the width direction is at most 50% of the maximum dimension of the length medium block in the height direction or in the length direction. Preferably, the maximum dimension of the solid medium block in the width direction is between 10% and 25% of the maximum dimension of the solid medium block in the height or length directions. The solid medium block may therefore have the shape of a thick plate standing upright, wherein the maximum dimension in the height direction is either greater, equal to or smaller than the maximum dimension in the length direction. Such a shape has proven to be particularly advantageous, since the solid medium block forms a large surface located in a vertical plane, which can be advantageously irradiated with concentrated solar radiation. The solid medium block may be relatively thin in the width direction, since, depending on the porosity of the solid medium block, the concentrated solar radiation can penetrate the material of the solid medium block only to a certain depth in the width direction, in order to heat the same. The solid medium block may have a graded structure with a porosity decreasing in a predefined direction. The predefined direction may, for example, be adapted to the irradiation direction of the concentrated solar radiation, with the solid medium block being arranged in the solar radiation receiver.

Preferably, the solid medium block is in the form of a parallelepiped. Of course, other shapes are also possible, such as e.g. a circular disc or other shapes, such as e.g. wedge, pyramid, frustum of wedge or frustum of pyramid shapes or the like. When designing the solid medium block as a parallelepiped, it may be provided in particular that the solid medium block is fastened on the transport means by one of its major surfaces that extends in the length and width directions. The mayor surface by which the solid medium block is fastened on the transport means may be arranged on a horizontal plane. It is also possible that the major surface is inclined with respect to the horizontal plane and is thus arranged on an inclined plane.

Elements preferably extending in the height direction may be embedded in the solid medium block for stabilization. Further, elements may be embedded that preferably extend in the width direction, which elements consist of a thermally conductive material, whereby the heat transport within the solid medium block is enhanced.

It is preferably provided that the at least one radiation opening is closed with a disc transparent to solar radiation. A disc transparent to solar radiation is a disc having a hemispheric solar transmittance (AM1.5) of at least 85% for solar radiation. By providing a transparent disc in a radiation opening, the receiver chamber can be closed, so that a desired atmosphere can be created in the receiver chamber. In this manner, the receiver chamber can advantageously be used as a reaction chamber. For example, a gas suction device may be provided at the reaction chamber, so that a vacuum can be generated in the receiver chamber. It is also possible to use flushing gas to remove oxygen. For example, in order to reduce the sold medium in the form of a redox material in the receiver chamber by means of the concentrated solar radiation, the released oxygen may advantageously be drawn at least partially from the receiver chamber. Thus, a low oxygen partial pressure prevails in the chamber, so that the reduction reaction is promoted and a repeated oxidation of the solid medium is prevented.

The solar radiation receiver according to the invention preferably comprises at least one vertical transport device, wherein the at least one opening of the receiver chamber is directed downward and the at least one vertical transport device inserts or removes the at least one solar absorber device into or from the receiver chamber in the vertical direction from below. Since solar radiation receivers are often arranged at higher levels, an insertion and removal of the at least one solar absorber device from below is possible in a constructively simple manner. In addition, a vertical transport device with a simple structure can be used for the insertion and removal of the solar absorber device from below. Of course, the at least one opening of the receiver chamber may also be directed upward, so that the at least one vertical transport device inserts the at least one solar absorber device into the receiver chamber in the vertical direction from above, and removes the same from there. It may also be provided that the at least one solar absorber device is inserted an oblique direction, e.g. obliquely upward. Further, the at least one solar absorber device may also be inserted in a horizontal direction, in which case the at least one opening is arranged e.g. laterally on the receiver chamber.

Basically, other, for example multi-axial transport devices are possible, for example combined vertical and horizontal transport devices, or devices in the form of one or a plurality of robot arms.

Here, it may be provided that the transport means of the solar absorber device is arranged under the solid medium block. In this manner, the vertical transport device can engage the transport means in an advantageous manner and is thermally insulated from the solid medium block by the transport device.

In a preferred embodiment of the solar radiation receiver according to the invention, a plurality of openings and a plurality of solar absorber devices are provided, wherein one respective solar absorber device is inserted into and removed from the receiver chamber through one of the openings. Thus, a plurality of solar absorber devices can be arranged in the receiver chamber at the same time.

Here, also a plurality of vertical transport devices can be provided, wherein each opening has a vertical transport device assigned thereto. Thus, the individual solar absorber devices can be independently inserted into and removed from the receiver chamber through the openings. For example, it is also possible to arrange two or a plurality of solar absorber devices one behind the other with respect to the irradiation direction of the concentrated solar radiation, so that upon removal of a solar absorber device from the receiver chamber, a solar absorber device is arranged in the chamber behind this solar absorber device, so that the concentrated solar radiation is used as optimally as possible and a continuous operation is possible.

A locking device may be provided at the at least one opening or at each opening, by which a solar absorber device inserted into the receiver chamber through the opening is locked in the inserted position. Thereby, the solar absorber device can be retained in the receiver chamber in an advantageous manner. In addition, when using a vertical transport device to insert the solar absorber device, it is possible to lower the vertical transport device after locking the solar absorber device by means of the locking device. While the solar absorber device is heated, the vertical transport device is thus separated therefrom, whereby the thermal stress on the vertical transport device can be reduced.

It is preferably provided that the locking device engages the transport means for locking.

In a preferred embodiment, it is provided that the at least one opening has a shape adapted to the shape of the transport means. It can be ensured thereby that in the inserted position of the solar absorber device, only a small gap remains between the transport means and the edges of the opening, so that the losses occurring at this site can be kept low.

It is preferably provided that the transport means of the solar absorber device comprises a plate section protruding laterally beyond the solid medium block, and the at least one opening is limited by an opening edge formed by a receiver chamber wall, wherein when the solar absorber device is in its position inserted in the receiver chamber, the protruding plate section abuts against the opening edge. The position of the solar absorber device can be predetermined by the plate section abutting against the opening edge, so that it is ensured that the solar absorber device is arranged at the correct position when being inserted into the receiver chamber.

It may further be provided that the locking device engages behind the plate section for locking.

In particular, it may be provided that the plate section is formed to extend circumferentially. Thus, the plate section can abut against the opening edge over the entire circumference and advantageously seal the opening when the solar absorber device is inserted in the opening.

The invention may advantageously provide that the at least one opening comprises a sealing closure set into the opening, wherein the sealing closure is removed when one of the solar absorber devices is inserted into the opening, wherein the solar absorber device pushing the sealing closure out of the opening.

It may also be provided that the solar absorber device opens the sealing closure. Here, the sealing closure may be designed as a flap or a lock. Moreover, the sealing closure may be pre-tensioned, for example via a spring, so that the sealing closure closes in a self-acting manner when the solar absorber devices are pulled out. The sealing closure may also be operated independently of the solar absorber device and be designed, for example, as a flap or lock. For example, a separate opening mechanism with a drive device for the sealing closure may be provided.

Thus, it can be ensured by means of the sealing closure that in a state, in which no solar absorber device is inserted in the opening, the opening is closed in a sealing manner so as to avoid heat loss and a gas exchange with the environment.

The at least one solar absorber device may have centering protrusion and the sealing closure may have a centering recess, wherein the centering protrusion is adapted to the centering recess. Upon insertion of the solar absorber device into the opening, the centering protrusion can thus be inserted into the centering recess. When being pushed out from the opening, the sealing closure can thus be retained in an advantageous manner at the solar absorber device by the centering protrusion and the centering recess.

It may be provided that at least one recess is arranged in the receiver chamber opposite the at least one opening, wherein the solar absorber device pushes the sealing closure into the recess when it is inserted into the receiver chamber.

In the position inserted into the receiver chamber, the solar absorber device thus holds the sealing closure. When the solar absorber device is removed from the receiver chamber, the sealing closure is guided back into the opening by the solar absorber device and can be released from the solar absorber device in a simple manner as soon as it is in the position sitting in the opening.

The configuration of the solar radiation receiver of the invention with the sealing closure that is operated via the solar absorber device, can be realized in a particularly advantageous manner, if the solar absorber device is inserted from below through the opening into the receiver chamber, since the sealing closure can the sit on top of the solar absorber device.

In a preferred embodiment of the invention, it is provided that the sealing closure has a tapering cross section, wherein inclined circumferential walls are formed that abut against limiting walls of the opening when the sealing closure is in a state in which it is inserted in the opening.

In other words, the sealing closure forms lead-in chamfers, so that upon insertion into the opening, the sealing closure advantageously slides into position via the inclined circumferential walls.

Preferably, it is provided that a horizontal transport device transports the at least one solar absorber device to the vertical transport device. After being heated and lowered by the vertical transport device, the solar absorber device can also be removed from the same by means of the horizontal transport device.

By providing a horizontal transport device realized separately of the vertical transport device, the transport devices that transport the solar absorber device to and from the solar radiation receiver can be of a simple design. Thereby, the number of the moved parts, which are subjected to high temperatures in the area of the solar radiation receiver and by the solar absorber devices, can be kept low.

Instead of the horizontal transport device, an alternative transport device is also possible which can transport the solar absorber axis in a multi-axial manner, such as a robot arm.

In addition, the solid medium block can comprise barrier layers extending transversely to a direction of insertion into the receiver chamber, which suppress a gas transport within the solid medium block in the direction of insertion. The barrier layers may, for example, extend transversely to the height direction. For example, a layer-wise structure may be provided, in which non-porous layers alternate with porous layers in order to impede gas transport upon insertion of the solid medium block into the receiver chamber. A thickness of the porous layers may be adapted to the width of the receiver chamber at the opening, in order to avoid a direct gas transport into and out from the receiver chamber.

The invention further relates to a reactor system comprising a solar radiation receiver according to the invention and a reactor chamber. Here, it may preferably be provided that at least a second vertical transport device inserts and removes the at least one solar absorber device into and from the reactor chamber in the vertical direction. Since the reactor chamber, in which the oxidizing of the redox material of the solar absorber device for the production of hydrogen occurs, should also be sealed from the environment as advantageously as possible, inserting the solar absorber device from below is particularly advantageous. With respect to the insertion mechanism, the reactor chamber may be designed in a manner similar to the solar radiation receiver of the invention, so that, for example, the transport means sealingly abuts against the opening after insertion into the reactor chamber, or that a sealing closure for the opening is provided.

It may also be provided that the reactor chamber is arranged adjacent the solar radiation receiver, wherein the at least one solar absorber device is transported directly from the solar radiation receiver into the reactor chamber. For example, the reactor chamber can be arranged below or above the solar radiation receiver. An intermediate stage for heat recovery may also be provided between the solar radiation receiver and the reactor chamber, in which stage the solar absorber device can be cooled and thermal energy can be transferred to other solar absorber devices or, for example, a heat accumulator for heat recovery.

Here, the transport means may comprise a seal which, depending on the position of the solar absorber device, seals the reactor chamber or the receiver chamber. In addition, a further seal may be arranged on a side of the solid medium block opposite the transport means, which seal ensures a sealing of the reactor chamber from the receiver chamber when the solid medium block is in the position inserted into the reactor chamber. Basically, corresponding seals may also be provided at the receiver chamber and/or the reactor chamber. Active seals can also be used. For example, the at least one opening can connect the receiver chamber and the reactor chamber, with a seal being arranged at the opening as a kind of lock. When the solid medium block is transferred into the reaction chamber, the seal can then completely close the opening, for example.

According to one embodiment, the solar absorber device comprises two solid medium blocks arranged one above the other. Above and below the receiver chamber, one reactor chamber is arranged, respectively, which are oriented towards each other and are assigned to the solid medium blocks. Using a transport means, the solid medium blocks are displaced, so that, always, one solid medium block is arranged in the receiver chamber and, alternately, one solid medium block is arranged in one of the reactor chambers. A connection device may be provided between the solid medium blocks. Using the connection device, also a sealing at the openings of the receiver chamber can be effected.

A plurality of receiver chambers may also be provided at the solar radiation receiver, which are each assigned in pairs to a plurality of solar absorber devices, each with two solid medium blocks arranged one above the other.

The above described embodiment comprising one or a plurality of solar absorber devices comprising two solid medium blocks arranged one above the other, is described as a vertical arrangement. Basically, a horizontal arrangement is also possible, in which the reactor chambers are arranged laterally beside the receiver chamber and are oriented towards each other in the horizontal direction. In this case, the corresponding solar absorber device or the solar absorber devices is or are formed in a horizontal arrangement with solid medium blocks arranged side by side. Variants are also conceivable, in which the transport direction of the solar absorber device(s) is oblique, i.e. inclined with respect to the vertical plane, with the position of the reactor chambers being adapted correspondingly.

The reactor system of the invention may also comprise a solar absorber device storage for receiving a plurality of solar absorber devices. For example, the solar absorber devices can be transported to the solar absorber device storage and be transported away from the same, using a further transport device.

The solar absorber devices can be stockpiled and stored temporarily in the solar absorber device storage. It may also be provided that solar absorber devices having solid medium blocks of different materials and/or with different geometries can be stored. When using solid medium blocks of a redox material, these may differ, for example, with respect to their thickness, their density or the reactive material implemented. Depending on the mode of operation, which may, for example, adapted to the irradiation conditions, different solar absorber devices can be used. In the reactor system of the invention, the total number of solar absorber devices used in operation can also vary. Thus, due to the solar absorber device storage, a different number of solar absorber devices not used can be stored temporarily. The solar absorber device storage also allows for a facilitated exchange of spent solar absorber devices, without interfering with the operation of the reactor system.

Preferably, the reactor system of the invention comprises at least a third vertical transport device that inserts and removes the solar absorber devices into or from the solar absorber device storage in the vertical direction.

In the reactor system of the invention, a heat transfer system comprising a heat transfer chamber may further be provided. The heat transfer chamber may have an inlet opening and an outlet opening, wherein the solar absorber devices are transported in opposite directions in two rows through the heat transfer chamber.

Thus, colder solar absorber devices which are transported to the solar radiation receiver, can be pre-heated by solar absorber devices already heated by solar energy. Due to the oppositely directed operation in two rows, a heat transfer can be effected according to the counterflow principle. Here, the heat transfer can be effected directly or indirectly, e.g. via a heat carrier fluid or a wall.

In the reactor system of the invention, it may also be provided that horizontal transport devices connect the at least one vertical transport device, the at least one second vertical transport device and the at least one third vertical transport device.

Using a transport system for the reactor system of the present invention, which consists of pure vertical transport systems and pure horizontal transport systems, has proven to be particularly advantageous.

BRIEF DESCRIPTION OF THE FIGURES

In the following, the present invention is described in more detail with reference to the following Figures. In the Figures.

DETAILED DESCRIPTION

Figure 1:
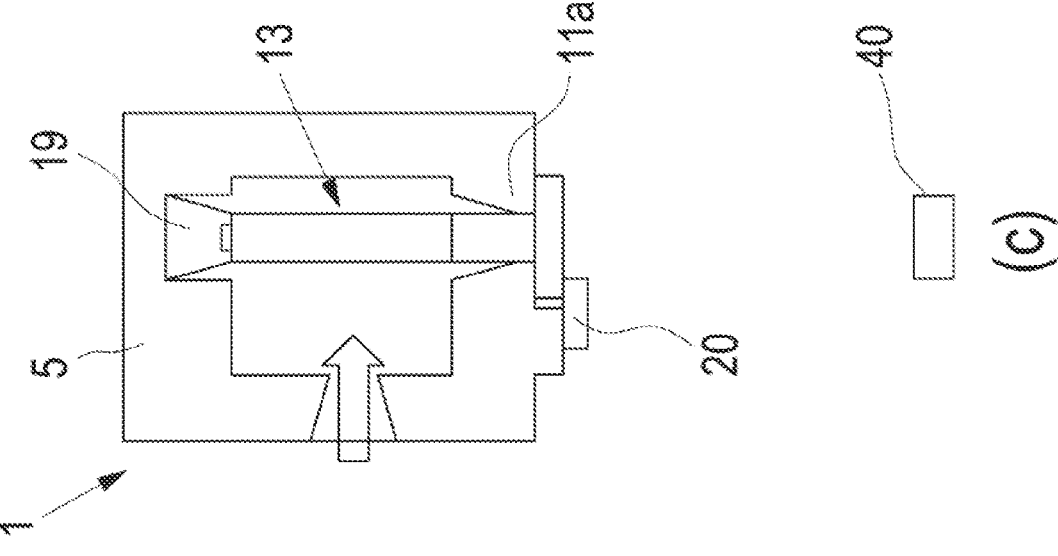
FIG. 1a is a schematic sectional view of a solar radiation receiver of the invention upon insertion of a solar absorber device.
FIG. 1b is a schematic sectional view of a solar radiation receiver of the invention upon insertion of a solar absorber device.
FIG. 1c is a schematic sectional view of a solar radiation receiver of the invention upon insertion of a solar absorber device.
Figure 1:
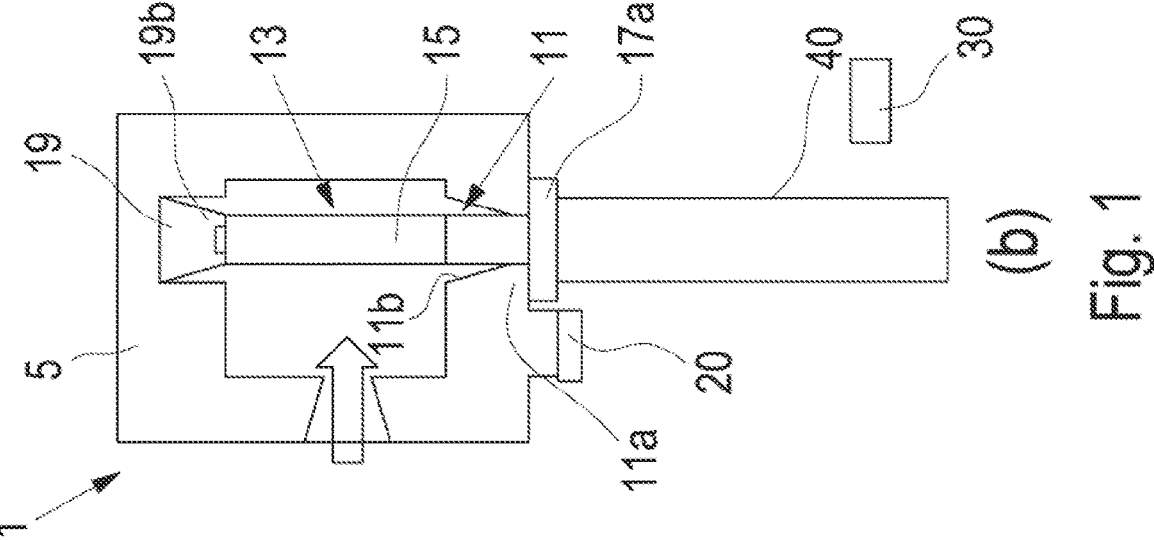
Figure 1:
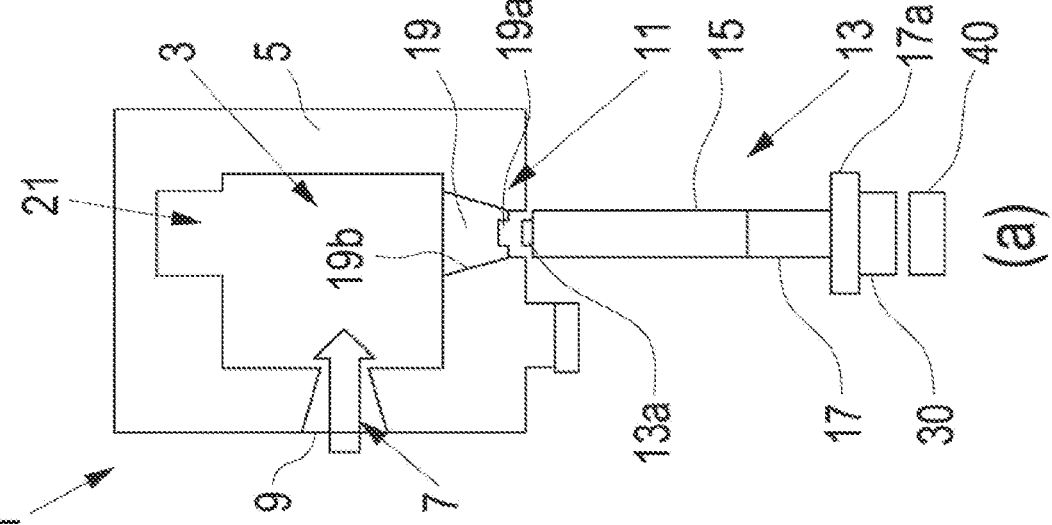

In FIGS. 1a-1c, a solar radiation receiver 1 of the present invention is schematically illustrated in section. The solar radiation receiver 1 has a receiver chamber 3 surrounded by a receiver chamber wall 5. The receiver chamber wall 5 forms a thermal insulation of the receiver chamber 3.

The receiver chamber 3 comprises a radiation opening 7, through which the concentrated solar radiation (shown in the Figures as a thick arrow) can be introduced into the receiver chamber 3. The radiation opening 7 is closed with a disc 9 transparent to solar radiation, so that a desired atmosphere can be created in the receiver chamber 3.

The receiver chamber 3 has an opening 11 at its lower end, through which a solar absorber device 13 can be inserted into the receiver chamber 3.

Figure 2:
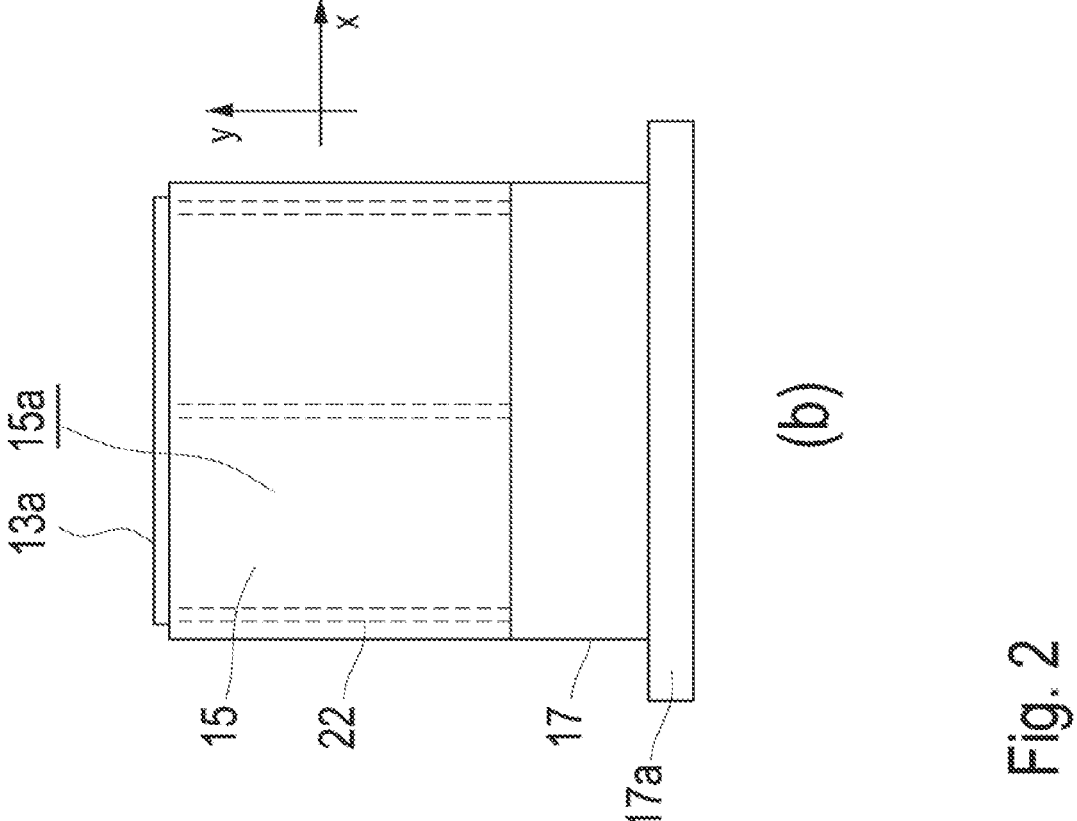
FIG. 2a is a view of the solar absorber device.
FIG. 2b is a view of the solar absorber device.
Figure 2:
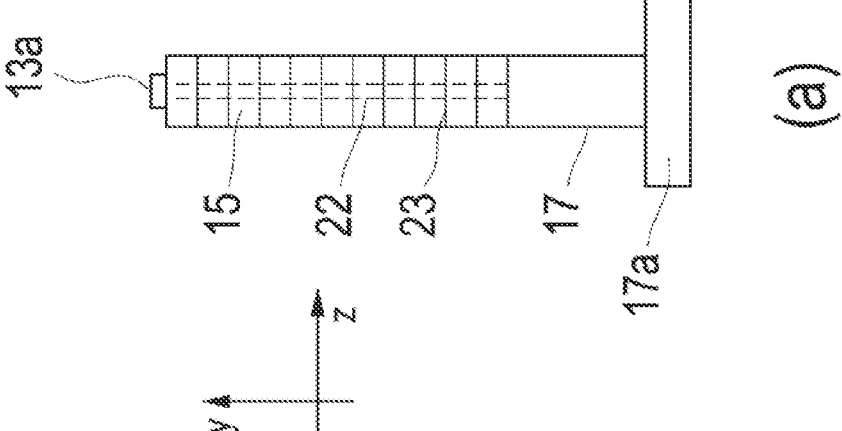

As best seen in FIGS. 2a and 2b, the solar absorber device 13 comprises a solid medium block 15 that is fastened on a transport means 17. However, the solar absorber device 13 comprises an insulation that thermally insulates the solid medium block 15 from the transport means 17.

In FIG. 1a, the solar absorber device 13 is illustrated just prior to being inserted into the receiver chamber 3. The opening 11 is closed with a sealing closure 19. The sealing closure 19 has a centering recess 19a at its lower end. The solar absorber device 13 has a centering protrusion 13a at its upper end, the protrusion being adapted to the centering recess 19a. Using a horizontal transport device 30, the solar absorber device 13 is positioned below the opening 11. Thereafter, as can be seen in FIG. 1b, the solar absorber device 13 is transported into the receiver chamber 3 in the vertical direction, using a vertical transport device 40. Here, the centering protrusion 13a of the solar absorber device 13 is inserted into the centering recess 19a of the sealing closure 19, so that the sealing closure 19 can sit on top of the solar absorber device 13 and can be maintained in this position.

As the solar absorber device 13 is moved vertically, the sealing closure 19 is pushed upward out of the opening 11.

The receiver chamber 3 further comprises a recess 21 into which the sealing closure 19 can be inserted after the solar absorber device 13 has been moved into the receiver chamber 3.

The sealing closure 19 has a cross section tapering downward, with inclined circumferential walls 19b being formed. In the state inserted in the opening 11, the inclined circumferential walls 19b abut against limiting walls 11b of the opening 11, so that an advantageous sealing is effected. Through the inclined circumferential walls, it is further ensured that, when removing the solar absorber device 13 from the receiver chamber 3 through the opening 11, the sealing closure 19 can reach the correct position in the opening 11.

In the state inserted in the receiver chamber 3, the solid medium block 15 of the solar absorber device 13 is arranged completely in the receiver chamber 3 and can be irradiated by the concentrated solar radiation.

The transport means 17 comprises a circumferential plate section 17a which, in the position of the solar absorber device 13 inserted into the receiver chamber 3, abuts against an opening edge 11a formed by the receiver chamber wall 5 and seals the opening 11 in this position.

A locking device 20 engages behind the plate section 17a and thus engages the transport means 17 in order to lock the solar absorber device 13 in the position inserted into the receiver chamber 3. Using the locking device 20, the solar absorber device 13 can be maintained in the position inserted into the receiver chamber 3. The vertical transport device 40 can thus be released from the solar absorber device 13, so that the thermal stress on the vertical transport device 40 can be reduced.

The solid medium block 15 can, for example, consist of a redox material and be porous. As is obvious from FIGS. 2a and 2b, the solid medium block 15 is cuboid in shape. It extends in a height direction (direction Y in FIGS. 2a and 2b), a length direction (direction X in FIG. 2b) and a width direction (direction Z in FIG. 2a). The maximum dimension of the solid medium block 15 in the height direction is shorter than the maximum dimension in the length dimension. The maximum dimension in the width direction is smaller than the maximum dimension in the height direction and the maximum dimension in the length direction and is, for example, about 25% of the maximum dimension of the solid medium block 15 in the height direction. In other words: The solid medium block 15 has the shape of a thick plate, wherein one major surface 15a is formed which can advantageously be irradiated with concentrated solar radiation when in a state inserted into the solar radiation receiver 1.

Elements 22 can be arranged in the solid medium block 15 that extend in the height direction and serve to stabilize the solid medium block 15. Further, second elements 23 can be provided, which extend in the width direction and essentially serve for an improved heat transport in the width direction. Thereby, an improved heating of the solid medium block 15 can be achieved. In addition, the solid medium block 15 can be structured such that a gas transport in the direction of insertion is suppressed, e.g. by a layered structure in the height direction, in which non-porous layers alternate with porous layers, in order to impede the gas transport upon insertion of the solid medium block 15 into the receiver chamber 3. The layer spacing may be adapted to the width of the receiver chamber wall 5 at the opening 11, in order to avoid a direct gas transport into and out from the receiver chamber 3.

Figure 3:
FIG. 3a is an arrangement of solar absorber devices of the invention in a solar radiation receiver.
FIG. 3b is an arrangement of solar absorber devices of the invention in a solar radiation receiver.
FIG. 3c is an arrangement of solar absorber devices of the invention in a solar radiation receiver.

In FIGS. 3a-3c, different designs of the solar radiation receiver 1 are illustrated.

The different solar radiation receivers 1 comprise a plurality of openings 11, through which one solar absorber device 13 can be inserted, respectively.

In FIG. 3a, a plurality of solar absorber devices 13 is arranged along an arcuate path in the receiver chamber 3. In FIG. 3b, a plurality of larger solar absorber devices 13 are arranged one behind the other with respect to the irradiation direction of the concentrate solar radiation. The solar absorber devices 13 can thus be removed from and be inserted again into the receiver chamber 3 one after the other, so that a continuous operation is possible in an advantageous manner.

In FIG. 3c, two rows of solar absorber devices 13 are arranged along an arcuate path. In addition, the solar radiation receiver 1 illustrated in FIG. 3c has two radiation openings 7, each closed with a transparent disc 9. A plurality of radiation openings 7 may be necessary, if, for example, the size of the transparent disc 9 is limited because of the high stress and the special requirements with respect to transparency.

Figure 4:
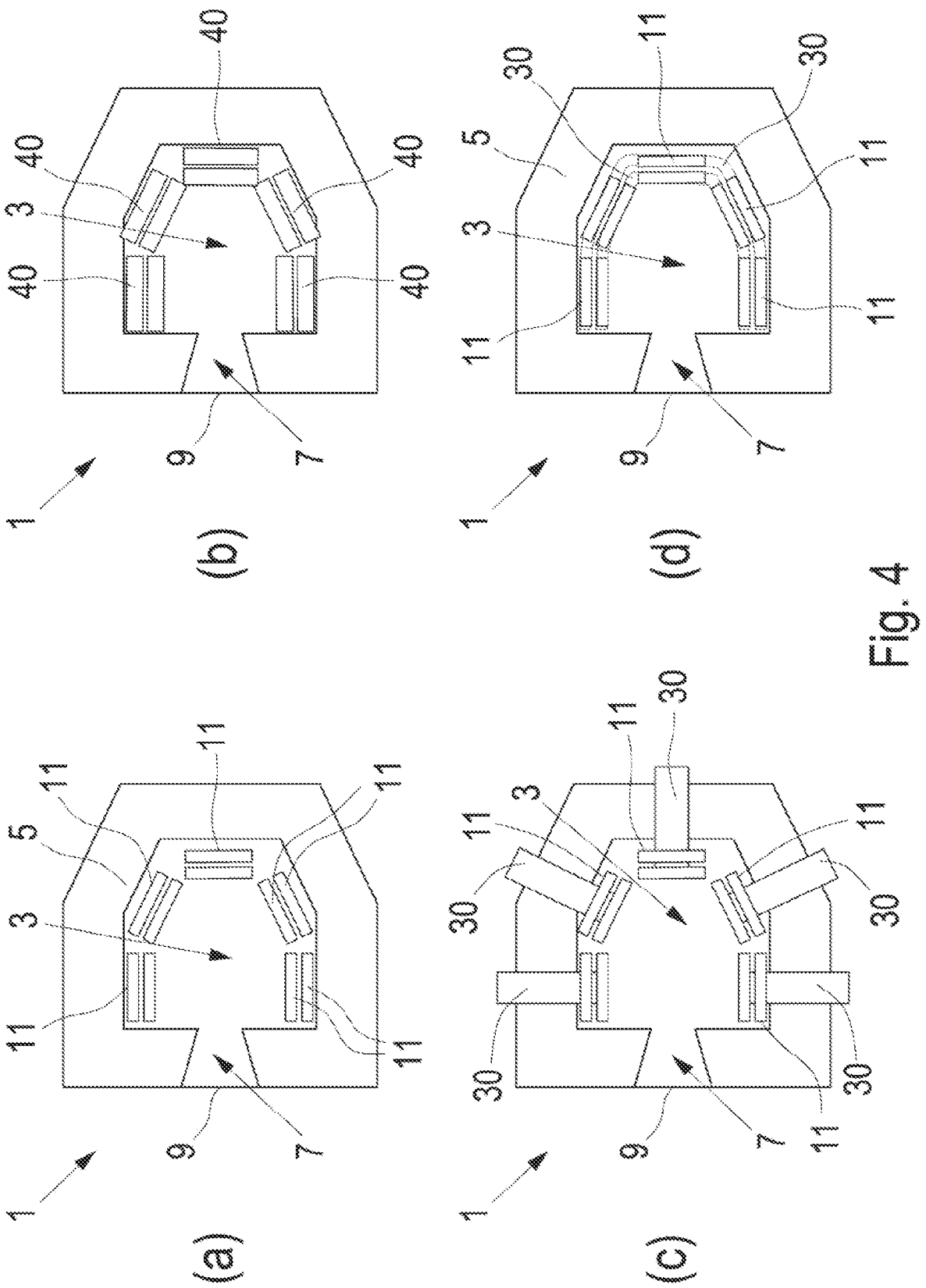
FIG. 4a is a schematic illustration of an arrangement of solar absorber devices in a solar radiation receiver with associated vertical transport devices and horizontal transport devices.
FIG. 4b is a schematic illustration of an arrangement of solar absorber devices in a solar radiation receiver with associated vertical transport devices and horizontal transport devices.
FIG. 4c is a schematic illustration of an arrangement of solar absorber devices in a solar radiation receiver with associated vertical transport devices and horizontal transport devices.
FIG. 4d is a schematic illustration of an arrangement of solar absorber devices in a solar radiation receiver with associated vertical transport devices and horizontal transport devices.

FIGS. 4a-4d illustrate another embodiment of a solar radiation receiver 1, wherein FIGS. 4c and 4d illustrate an alternative with respect to the horizontal transport device 30.

In FIG. 4a, the solar radiation receiver 1 is shown without the solar absorber devices 13. The openings 11 are arranged in two rows along arcuate paths. As can be seen in FIG. 4b, a plurality of vertical transport devices 40 are arranged below the solar radiation receiver 1, with the positions of the vertical transport devices 40 being adapted to the position of the openings 11.

As can be seen in FIGS. 4c and d, a plurality of horizontal transport devices 30 extend to below the openings 11, so that the solar absorber devices 13 can be positioned below the openings 11 and on the vertical transport devices 40 by means of the horizontal transport devices 30. In FIG. 4c, horizontal transport devices 30 are illustrated which can each serve two openings adjacent to one another.

In FIG. 4d, illustrates an alternative embodiment, in which the horizontal transport devices 30 can transport the solar absorption 13 along an arcuate path, so that all openings 11 lying in a row on an arcuate path can be served by a horizontal transport device 30.

Figure 5:
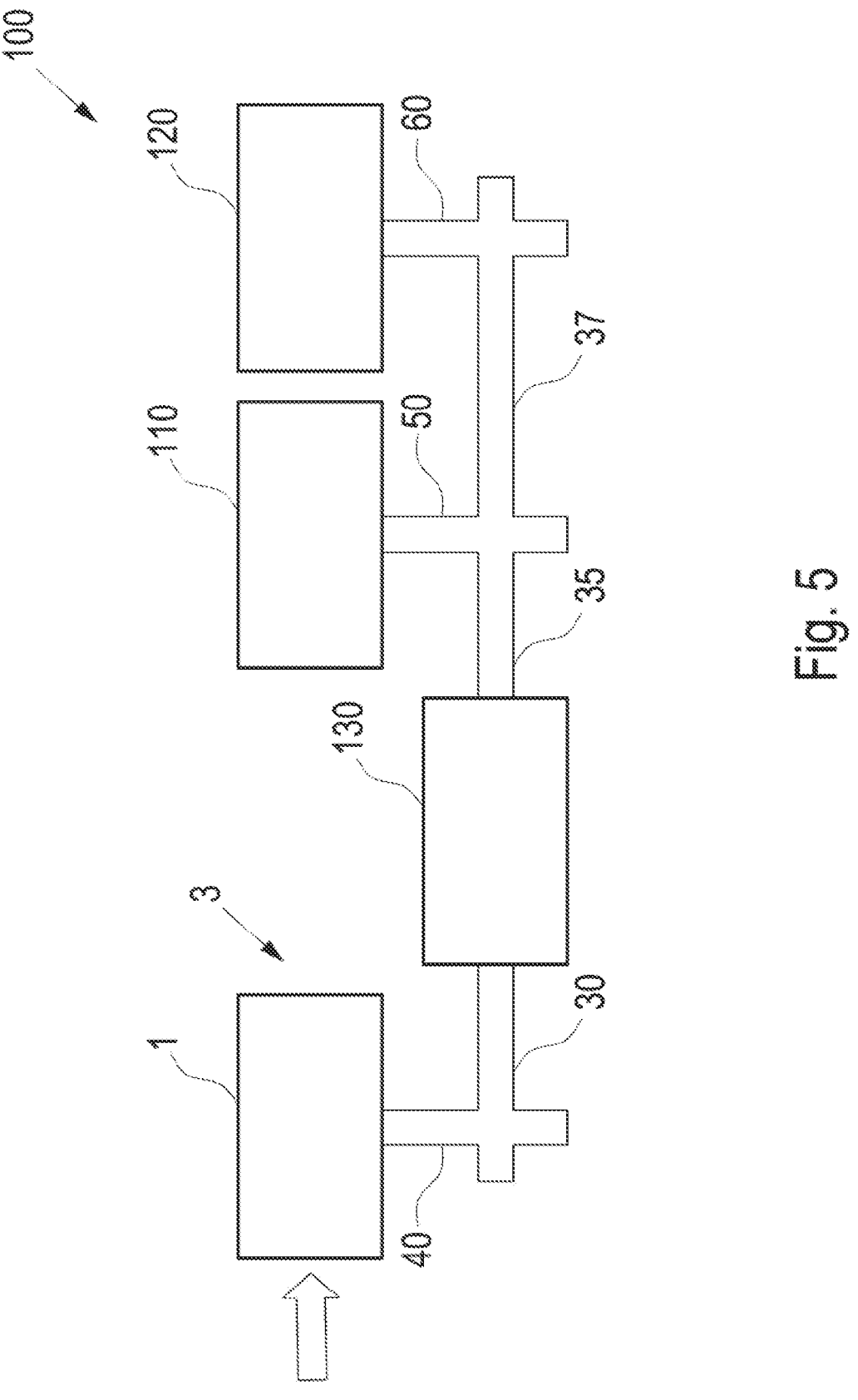
FIG. 5 is a principle illustration of the reactor system of the present invention.

FIG. 5 schematically illustrates a reactor system 100 in a schematic diagram.

The reactor system 100 comprises a receiver 1 according to the invention having the receiving chamber 3 and one or a plurality of vertical transport devices 40. Further, the reactor system 100 comprises a reactor chamber 110, a solar absorber device storage 120 and a heat transfer system 130. The solar absorber devices comprising a solid medium block of a redox material are heated and reduced in the solar radiation receiver 1 using solar radiation. Subsequently, these are transported through the heat transfer system 130, wherein a heat transfer to colder solar absorber devices occurs. Thereafter, the reduced and cooled solar absorber devices are placed into the reactor chamber 110 and subjected to water vapor, whereby hydrogen is produced due to the oxidation of the redox material by the oxygen of the water vapor.

The horizontal transport device 30 can transport the solar absorber devices from the vertical transport device 40 to the heat transfer system 130 or transport solar absorber devices from the heat transfer system 130 to the vertical transport device 40. A second vertical transport device 50 can be provided for the transport of the solar absorption devices into the reactor chamber 110. The solar absorber devices can be transported to the second vertical transport device and away from the same via a second horizontal transport device 35.

Further, a solar absorber device storage 120 can be provided, in which solar absorber devices can be stored temporarily or stockpiled. The solar absorber device storage 120 can be served via a third vertical transport device 60. A third horizontal transport device 37 can transport solar absorber devices to the third vertical transport device 60 and away from the same.

Figure 6:
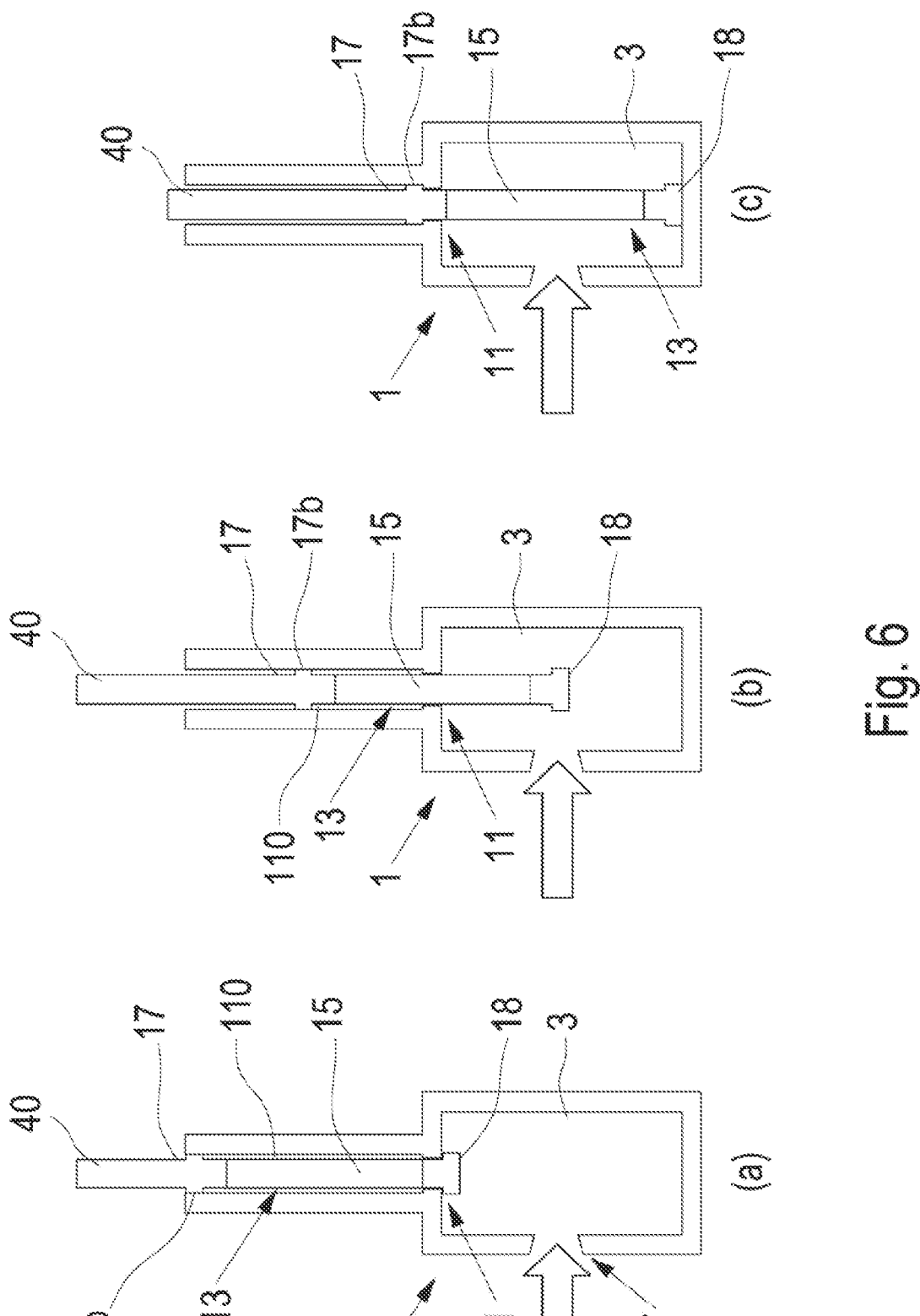
FIG. 6a is a schematic illustration of a second embodiment of a solar radiation receiver of the present invention.
FIG. 6b is a schematic illustration of a second embodiment of a solar radiation receiver of the present invention.
FIG. 6c is a schematic illustration of a second embodiment of a solar radiation receiver of the present invention.

FIGS. 6a-6c are schematic illustrations of a second embodiment of a solar radiation receiver 1 of the present invention.

In the embodiment illustrated, the reactor chamber 3 is arranged directly adjoining the solar radiation receiver 1. The solar absorber device 13 is transported directly into the reactor chamber from the solar radiation receiver by means of the vertical transport device 40. The reactor chamber 110 is arranged above the solar radiation receiver 1. The opening 11 of the receiver chamber 3 opens directly into the reactor chamber 110.

FIGS. 6a-6c show the solar absorber device 13 in different positions. In FIG. 6a, the solar absorption device 13 is illustrated with the solid medium block 15 completely in the reactor chamber 110. In FIG. 6c, the solar absorption device 13 is illustrated with the solid medium block 15 completely in the receiver chamber 3.

The transport means 17, on which the solid medium block 15 is arranged, comprises a seal 17b which, depending on the position of the solar absorber device 13, seals the reactor chamber 110 or the receiver chamber 3. In addition, a further seal 18 is arranged at a side of the solid medium block 15 opposite the transport device 17, which seal ensures a sealing of the reactor chamber 110 from the receiver chamber 3, when the solid medium block is in its position inserted into the reaction chamber 110 (FIG. 6a).

Basically, corresponding seals can also be provided at the receiver chamber 3, in particular the opening 11, and/or at the reactor chamber 110. Active seals can also be used. For example, the at least one opening 11 can connect the receiver chamber 3 and the reactor chamber 110, with a seal being arranged at the opening 11 as a kind of lock. When the solid medium block 15 has been moved into the reactor chamber 110, the seal may then, for example, close the opening 11 completely.

Figure 7:
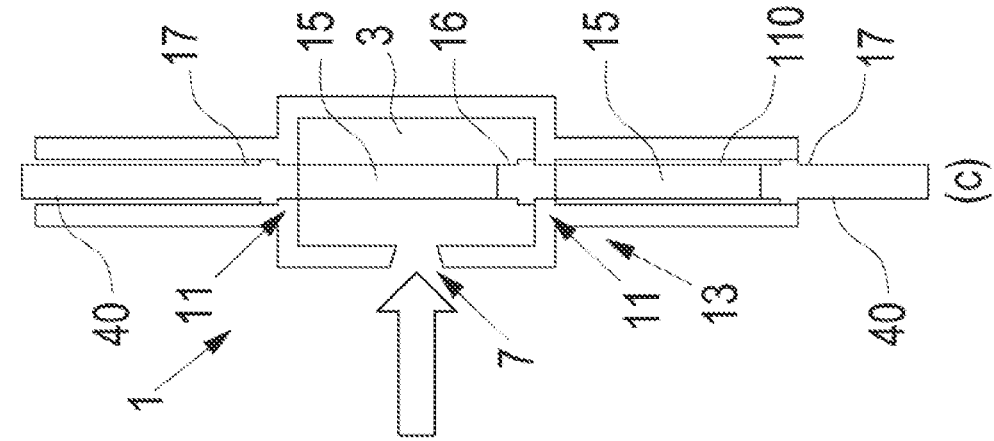
FIG. 7a is a schematic illustration of a third embodiment of a solar radiation receiver of the present invention.
FIG. 7b is a schematic illustration of a third embodiment of a solar radiation receiver of the present invention.
FIG. 7c is a schematic illustration of a third embodiment of a solar radiation receiver of the present invention.
Figure 7:
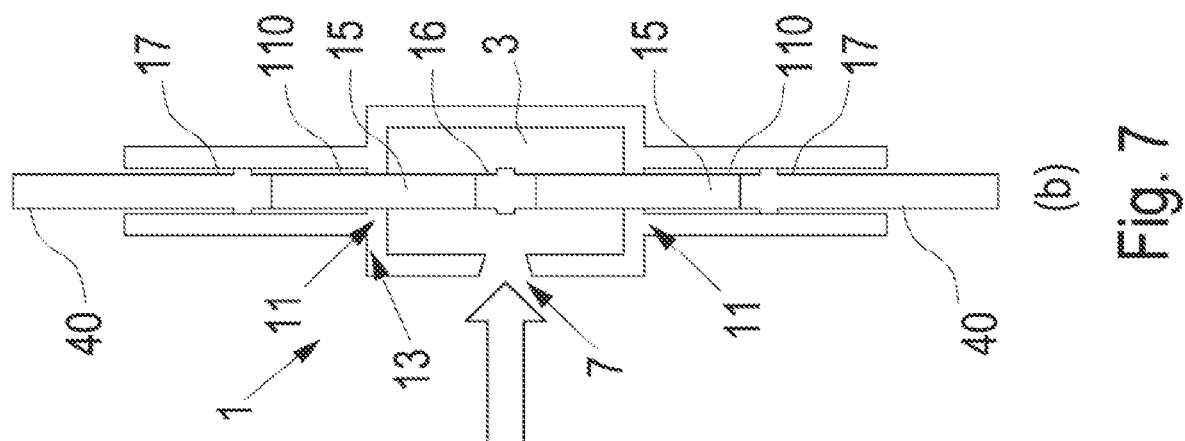
Figure 7:
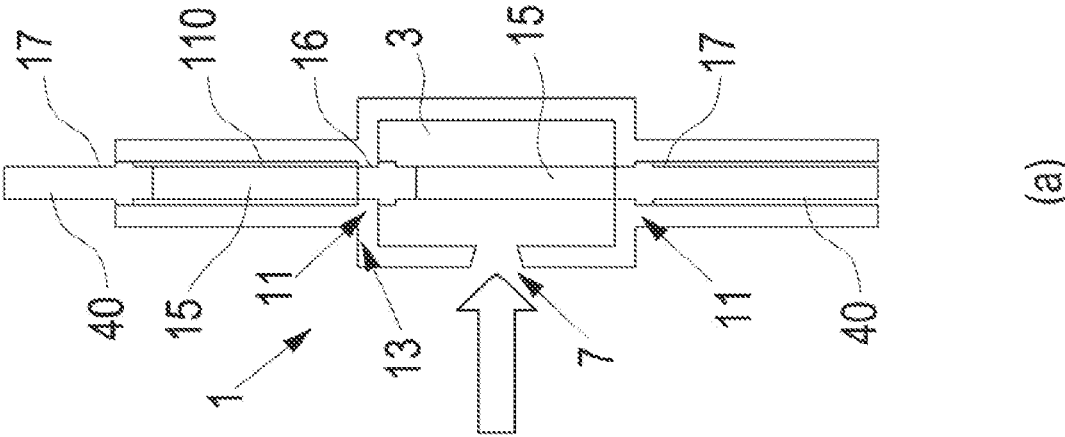

FIGS. 7a-7c are schematic illustrations of a third embodiment of a solar radiation receiver 1 of the present invention.

In the embodiment illustrated in FIGS. 7a-7c, the solar absorber device 13 comprises two solid medium blocks 15 arranged one above the other. The transport means 17 consists of two parts. Above and below the receiver chamber 3, one reactor chamber 110 is arranged, respectively, which are oriented towards each other and are assigned to the solid medium blocks 15. Using a transport means 40, the solid medium blocks 15 are displaced, so that, at any time, one solid medium block 15 is arranged in the receiver chamber 3 and, alternately, one solid medium block 15 is arranged in one of the reactor chambers 110. A connection means 16 may be provided between the solid medium blocks 15. Using the connection means 16, also a sealing at the openings 11 of the receiver chamber 3 can be effected.

FIGS. 7a-7c show the solar absorber device 13 in different positions. In FIG. 7a, the solar absorption device 13 is illustrated with the upper solid medium block 15 completely in the upper reactor chamber 110, while the lower solid medium block 15 is arranged in the receiver chamber 3. In FIG. 7c, the solar absorption device 13 is illustrated with the solid medium block 15 completely in the lower reactor chamber 110, while the upper solid medium block 15 is arranged in the receiver chamber 3.

The embodiments described above with reference to FIGS. 6a to 7c may also comprise a plurality of solar absorber devices 13 with correspondingly assigned reactor chambers. For example, the solar absorber devices 13 of the arrangement illustrated in FIG. 3c may be provided. In this case, the solar radiation receiver 1 may also comprise a plurality of radiation openings 7.

LIST OF REFERENCE NUMERALS

1 solar radiation receiver
3 receiver chamber
5 receiver chamber wall
7 radiation opening
9 transparent disc
11 opening
11a opening edge
11b limiting walls
13 solar absorber device
13a centering protrusion
15 solid medium block
15a major surface
16 connection means
17 transport means
17a plate section
17b seal
18 further seal
19 sealing closure
19b centering recess
19b circumferential walls
20 locking device
21 recess
22 elements
23 second elements
30 horizontal transport device
35 second horizontal transport device
37 third horizontal transport device
40 vertical transport device
50 second vertical transport device
60 third vertical transport device
100 reactor system
110 reactor chamber
120 solar absorber device storage
130 heat transfer system

The invention claimed is:

1. A solar radiation receiver, comprising:
a receiver chamber having at least one radiation opening through which concentrated solar radiation can be introduced into the receiver chamber, having at least one solar absorber device, and having at least one opening,
wherein the solar absorber device comprises a transport device,
wherein at least one solid medium block is fastened to the transport device,
wherein the at least one solar absorber device is inserted through the at least one opening such that the at least one solid medium block is arranged in the receiver, and through which the solar absorber device is removed, and
wherein the at least one solid medium block comprises a porous redox material or a porous heat carrier material.

2. The solar radiation receiver according to claim 1, wherein the at least one radiation opening is closed with a disc transparent to solar radiation.

3. The solar radiation receiver according to claim 1, further comprising: at least one vertical transport device, wherein the at least one opening is directed downward and the at least one vertical transport device inserts the at least one solar absorber device into the receiver chamber in the vertical direction from below and removes the same from below.

4. The solar radiation receiver according to claim 3, further comprising: a horizontal transport device which transports the at least one solar absorber device to the vertical transport device.

5. The solar radiation receiver according to claim 1, further comprising: a plurality of openings and a plurality of solar absorber openings, wherein one solar absorber device is inserted into and removed from the receiver chamber through one of the openings, respectively.

6. The solar radiation receiver according to claim 5, further comprising: a plurality of vertical transport devices, wherein each opening has a vertical transport device assigned thereto.

7. The solar radiation receiver according to claim 1, further comprising: a locking device arranged at the at least one opening or at each opening, by which device a solar absorber device inserted into the receiver chamber via the opening is locked in the inserted position.

8. The solar radiation receiver according to claim 7, wherein the locking device engages the transport device for locking.

9. The solar radiation receiver according to claim 1, wherein the at least one opening has a shape adapted to the shape of the transport device.

10. The solar radiation receiver according to claim 8, wherein the transport device of the solar absorber device comprises a plate section protruding laterally beyond the solid medium block, wherein the at least one opening is limited by an opening edge formed by a receiver chamber wall, and wherein, when the solar absorber device is in the position inserted into the receiver chamber, the protruding plate section abuts against the opening edge.

11. The solar radiation receiver according to claim 10, wherein the locking device engages behind the plate section for locking.

12. The solar radiation receiver according to claim 10, wherein the plate section is designed to extend circumferentially.

13. The solar radiation receiver according to claim 1, wherein the at least one opening comprises a sealing closure set into the opening, wherein upon the insertion of one of the solar absorber devices into the opening, the sealing device is removed, and wherein the solar absorber device pushes the sealing closure out of the opening.

14. The solar radiation receiver according to claim 13, wherein the at least one solar absorber device comprises a centering protrusion and the sealing closure comprises a centering recess, wherein the centering protrusion is adapted to the centering recess.

15. The solar radiation receiver according to claim 13, wherein at least one recess is arranged in the receiver chamber opposite the at least one opening, wherein the solar absorber device pushes the sealing closure into the recess upon insertion into the receiver chamber.

16. The solar radiation receiver according to claim 13, wherein the sealing closure has a tapering cross section, wherein inclined circumferential walls are formed which, when the sealing closure is in the state inserted in the opening, abut against the limiting walls of the opening.

17. The solar radiation receiver according to claim 1, wherein the solid medium block comprises barrier layers extending transversely to a direction of insertion into the receiver chamber, which suppress a gas transport within the solid medium block in the direction of insertion.

18. A reactor system with a solar radiation receiver according to claim 1, comprising a reactor chamber, wherein at least one second vertical transport device inserts the at least one solar absorber device into the reactor chamber and removes the device from the same.

19. The reactor system according to claim 18, wherein a solar absorber device storage for receiving a plurality of solar absorber devices.

20. The reactor system according to claim 19, wherein at least one third vertical transport device inserts the solar absorber devices into the solar absorber device storage and removes the devices from the same.

21. The reactor system according to claim 18, wherein a heat transfer system having a heat transfer chamber with an inlet opening and an outlet opening, wherein the solar absorber devices are moved in two rows in opposite directions through the heat transfer chamber.

22. The reactor system according to claim 18, wherein horizontal transport devices connect the at least one vertical transport device, the at least one vertical transport device and the at least one third vertical transport device.

* * * * *